(12) United States Patent
Edwards et al.

(10) Patent No.: US 12,726,417 B2
(45) Date of Patent: Sep. 1, 2026

(54) SYSTEMS AND METHODS FOR CALENDAR-BASED QoS MANAGEMENT OF A NETWORK

(71) Applicant: Adeia Guides Inc., San Jose, CA (US)

(72) Inventors: Warren Keith Edwards, Atlanta, GA (US); Serhad Doken, Bryn Mawr, PA (US); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/115,576

(22) Filed: Feb. 28, 2023

(65) Prior Publication Data

US 2024/0291735 A1 Aug. 29, 2024

(51) Int. Cl.
*H04L 41/5022* (2022.01)
*H04L 47/76* (2022.01)

(52) U.S. Cl.
CPC .......... *H04L 41/5022* (2013.01); *H04L 47/76* (2013.01)

(58) Field of Classification Search
CPC ............................ H04L 41/5022; H04L 47/76
See application file for complete search history.

(56) References Cited

U.S. PATENT DOCUMENTS

2009/0077257 A1* 3/2009 Savoor ................ H04L 41/0681 714/E11.144
2010/0161800 A1* 6/2010 Moon ..................... H04L 47/72 709/226
2017/0147987 A1* 5/2017 Borsum ............. G06Q 10/1093
2018/0219794 A1* 8/2018 Patil ...................... H04L 47/745
2018/0278570 A1* 9/2018 Dhanabalan ........ H04L 61/5007
2021/0064431 A1* 3/2021 Smith ................... G06F 9/5077
2023/0110012 A1* 4/2023 Jasleen ............... G06F 11/3433 718/104
2023/0254243 A1* 8/2023 Vysotsky ................ H04L 45/02 370/389

OTHER PUBLICATIONS

Grinter, Rebecca E., et al., "The Work to Make a Home Network Work", Proceedings of the Ninth European Conference on Computer-Supported Cooperative Work (ECSCW'05). Paris, France. Sep. 18-22, 2005.
Shehan, Erika , et al., "Home Networking and HCI: What Hath God Wrought?", Proceedings of the ACM Conference on Human Factors in Computing Systems (CHI 2007). San Jose, California. Apr. 28-May 3, 2007.

* cited by examiner

*Primary Examiner* — Dhairya A Patel
*Assistant Examiner* — Eui H Kim
(74) *Attorney, Agent, or Firm* — HG LAW LLP

(57) ABSTRACT

Systems and methods for calendar-based management of QoS parameters of networks are disclosed. Calendar data from a digital calendar is used to identify a scheduled event which utilizes a priority application associated with network priority. A priority level of network service to support performance of the priority application on a device in the network during the scheduled event is determined. A reconfiguration request is transmitted to a networking device of the network. The reconfiguration request causes the networking device to adjust its network QoS parameters according to the priority level of network service and provide a network resource such as bandwidth according to the adjusted network QoS parameters to the priority application during the scheduled event. When the scheduled event has ended, the networking device is instructed to release the network resource.

18 Claims, 5 Drawing Sheets

300

| Application | Tier Level | Bandwidth Up/Down | Latency | Jitter | Packet Loss |
|---|---|---|---|---|---|
| Video Conference | High | 3.8 Mbps/ 3.0 Mbps | 150 ms | 40 ms | 2 % |
| Video Conference | Middle | 2.6 Mbps/ 1.8 Mbps | 175 ms | 45 ms | 4 % |
| Video Conference | Low | 1.0 Mbps/ 600 kbps | 175 ms | 50 ms | 6 % |

| Application | Tier Level | Bandwidth Down | Latency | Jitter | Packet Loss |
|---|---|---|---|---|---|
| Streaming Media | 4K | 15 Mbps | 150 ms | 40 ms | 2 % |
| Streaming Media | 1080p | 5 Mbps | 175 ms | 45 ms | 4 % |
| Streaming Media | 720p | 3 Mbps | 175 ms | 50 ms | 6 % |
| Streaming Media | Standard | 1 Mbps | 175 ms | 55 ms | 6 % |

FIG. 3B

SYSTEMS AND METHODS FOR CALENDAR-BASED QoS MANAGEMENT OF A NETWORK

FIELD OF INVENTION

Embodiments of the present disclosure relate to dynamically managing network Quality of Service (QoS) parameters based on scheduled application usage.

BACKGROUND

As more people work remotely from home, networks (such as a local network or home network) experience increasing demands to support multiple high bandwidth and latency-sensitive work-oriented applications (such as video conferencing). Meanwhile, the network continues to be used for more traditional home-oriented applications (such as streaming, gaming, and general web usage). Thus, work-oriented applications are competing for network priority with other, non-work applications. However, networks such as local or home networks are generally unmanaged by their users because home network management tasks are notoriously difficult for most household users. As such, there is a desire for improved methods for managing QoS parameters for home networks.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIG. 3A is an illustrative schema of a network quality database, in accordance with some embodiments of the disclosure;

FIG. 3B is another illustrative schema of a network quality database, in accordance with some embodiments of the disclosure;

DETAILED DESCRIPTION

Figure 1:
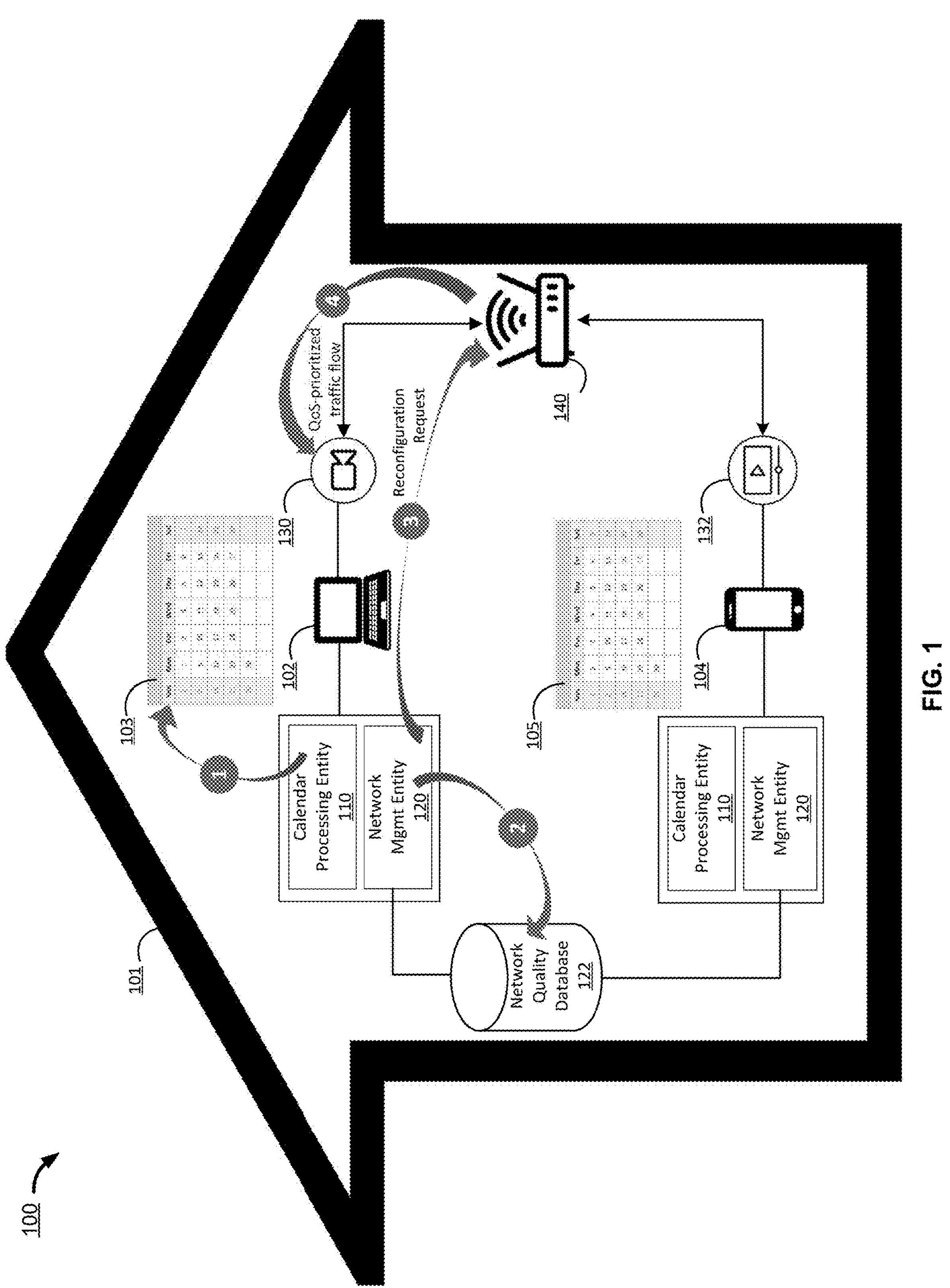
FIG. 1 is an illustrative diagram of a system for a calendar-based QoS management of a network, in accordance with some embodiments of the disclosure.

In accordance with some embodiments disclosed herein, some of the above-mentioned limitations for managing QoS parameters for networks are addressed by extracting calendar data from a digital calendar to determine that a scheduled event utilizes an application during the time period of the scheduled event. Also based on the calendar data, the application is determined to be a priority application requiring network priority, which requires a priority level of network service to support performance of the application on a user device in a network during the time period. The calendar data may further be used to determine the priority level of network service of the application. A reconfiguration request is transmitted to a networking device in the network. The reconfiguration request causes the networking device to adjust its network QoS parameters according to the priority level of network service. The networking device provides, and maintain provision of, a network resource according to the adjusted network QoS parameters to the priority application to meet the priority level of network service. When the time period has ended, the networking device is instructed to release the network resource.

According to some embodiments, the priority level of network service is based on at least one of: an importance level of the event, an event type, the time period, type of participants of the event, participant behavior during the event, type of activity performed through the application during the event or expected audio or video usage during the event. In some embodiments, the priority level of network service comprises at least one of a bandwidth setting, latency setting, jitter setting, or packet loss setting. In some embodiments, the priority level of network service is determined based on data retrieved from a network quality database that includes a respective priority level of network service for each of a plurality of applications. In some embodiments, the application is associated with a hierarchy of service tiers, each service tier corresponding to a different priority level of network service to support different performance levels of the application.

According to some embodiments, the networking device is instructed to release the network resource in response to determining that the application has terminated. In some embodiments, releasing the network resource returns the networking device to network QoS parameters prior to the reconfiguration request.

According to some embodiments, second calendar data is extracted from a second digital calendar to determine that a second scheduled event utilizes a second application for at least a portion of the time period of the first application. Based on the second calendar data, the second application is s determined to be a second priority application requiring network priority, which requires a second priority level of network service to support performance of the second application on another user device in the network during the time period. The calendar data may further be used to determine a second priority level of network service of the second application. The combination of the first priority level and the second priority level may exceed a threshold network capacity. In response, a lower first priority level to support a lower performance of the first application is determined such that a combination of the lower first priority level and the second priority level does not exceed the threshold network capacity. A negotiated reconfiguration request is transmitted to the networking device. The negotiated reconfiguration request causes the networking device to adjust the network QoS parameters of the networking device according to the combination of the lower first priority level and the second priority level. The networking device provides, and maintains provision of, the network resource according to the adjusted network QoS parameters to the first application to meet the lower first priority level of network service and to the second application to meet the second priority level of network service. When both of the applications have terminated, the networking device is instructed to release the network resource.

According to some embodiments, the negotiated reconfiguration request is based on at least one of: the priority level of network service of each scheduled event, the importance level of the first scheduled event compared to the importance level of the second scheduled event, or a timing of a priority level request of each event. In some embodiments, the negotiated reconfiguration request comprises a request for a lower first priority level corresponding to a first lower service tier associated with the first application and a request for a lower second priority level corresponding to a second lower service tier associated with the second application.

According to some embodiments, the system detects that total network usage exceeds the threshold network capacity due to usage by an unscheduled application associated with an event not in the digital calendar. In response, the networking device is instructed to throttle the usage by the unscheduled application such that the total network usage does not exceed the threshold network capacity.

According to some embodiments, the system detects that a second scheduled event requiring use of a second application is being added to the digital calendar for at least a portion of the time period, wherein the second application corresponds to a second priority level of network service. The combination of the first priority level of network service and the second priority level of network service may exceed the threshold network capacity. In response, an alternate time period for scheduling the second event is recommended.

According to some embodiments, second calendar data is extracted from a second digital calendar to determine that a second event utilizes the same application and during the same time period as the first event. Based on the first calendar data and/or the second calendar data, the second event is determined to be the same event as the first event. Details of the second event are disregarded and the reconfiguration request is determined based on details of the first event.

FIG. 1 is an illustrative diagram of an example system 100 for calendar-based QoS management of a network, in accordance with some embodiments of the disclosure. In an embodiment, the system comprises a network 101, user devices 102, 104, calendars 103, 105 applications 130, 132, calendar processing entity (CPE) 110, network management entity (NME) 120, network quality database 122, and router 140. Network 101 may be a local area network (e.g., a home network, small business network, etc.), or other internet network. Router 140 connects devices 102, 104 to network 101 as well as connects the devices to each other. The connections may be wired and/or wireless connections. In another embodiment, a plurality of routers may be installed in network 101 and connect network 101 with device(s). User devices 102, 104 can be any device suitable on which an application (such as a video conference application, media streaming application, etc.) may operate, for example, a laptop, smart phone, tablet, television, audio device, and the like. Although two user devices are shown in the example, any number of devices may be connected to network 101. A user may be associated with a device or multiple devices. Each user may also be associated with a calendar or multiple calendars.

A calendar 103, 105 can comprise a digital calendar which stores and maintains each user's scheduled events (also referred to as calendar events). In some embodiments, calendars may be stored in a local storage or accessed from a remote server. For example, a user's calendar may reside on and/or may be accessible through the device(s) associated with the user. The scheduled events may include appointments requiring use of an application. For example, a user may be scheduled for a work meeting that requires use of a video conferencing application 130, an appointment to watch a movie through a multi-media player 132, and the like.

According to an embodiment, a scheduled event may include use of an application that is a priority application associated with a network priority. An application which has network priority is provided a priority level of network service or resources (also referred to as a priority level), such as high bandwidth, low latency, etc., to support performance of the application (e.g., to carry out the scheduled event on the corresponding user device) and/or over other applications, if any, running on the same network. The priority application may be given network priority for the duration of the scheduled event (or a portion thereof). For example, during a scheduled event which uses a priority application, a higher level of network resources (e.g., bandwidth, low latency, low jitter, etc.) may be dedicated to the priority application than for non-priority applications.

Identifying or determining that a given application is a priority application may be based on one or more factors, such as a desired or recommended priority level (e.g., level of network service) of the given application, calendar data (e.g., details relating to the scheduled event), historical usage data, among others. For example, applications 130, 132 may each be associated with a desired or recommended priority level, such as particular QoS parameters (e.g., particular rate for upload and download bandwidth, a minimum latency or acceptable packet loss, etc.) to support performance of the application on the corresponding user device. An application may be a priority application if it requests a particular QoS parameter(s). In another example, an application which is a priority application may desire or recommend priority level such that dedicating network priority at that priority level would result in insufficient network resources for other concurrent, non-priority applications (or to meet the priority level of the other concurrent non-priority applications).

Calendar data may include an importance level of the scheduled event (e.g., whether the scheduled event is marked on the calendar as important, mandatory, optional, etc., for a respective participant or group of participants), the type of event or activity involved (e.g., work-oriented event, recreational, personal, etc.), expected audio or video usage such as whether the meeting is set for listen-only mode, attached documents for sharing, additional event details such as a meeting agenda, enclosed video conference hyperlinks or access codes, etc.), time and date and/or duration of the scheduled event (e.g., during a weekday, a video conferencing application may have priority over a gaming application), participant data (e.g., participant list for the scheduled event, size of the participant list, types or identities of participants invited, role of the user, whether user's attendance is mandatory, relationships between the user and other participants, whether an invitation for the scheduled event was sent a work or personal email address, etc.), application data (e.g., the type of application required by the scheduled event, such as a particular video conferencing application, a media player, and the like, amount of network resources such an application requires for minimal, standard, or optimal performance, etc.), and so forth.

Historical usage data may include user activity data (e.g., historical user active participation in similar scheduled events and/or when using the given application, such as speaking, sharing screen, commenting, having their camera on, etc.), characteristics of similar scheduled events in the past (e.g., meetings involving the same group of participants or which routinely recur have historically been listen-only mode, involved screen sharing, etc.), among others. In other embodiments, an application may be determined to be a priority application based on manual configuration (such as user preferences), the type of application (e.g., video conferencing applications are given priority while gaming applications are considered non-priority), and so forth.

Other factors may be used in determining that a given application is a priority application, such as manual configurations or user preferences. For example, network priority can by default be dedicated to a particular application or particular user device. In another example, network priority can be dedicated to applications and/or devices in the network 101 associated with a particular user (e.g. based on parental controls).

According to an embodiment, the priority level for the identified priority application (e.g., the type of network resource and/or quality of network service appropriate for performance of the application on a corresponding user device) is determined based on any one or combination of the aforementioned factors. Alternatively or in conjunction, the priority level is determined from a set of recommended or required network settings that facilitate optimal performance of the priority application on the corresponding user device. For example, a priority application can be associated with a set of recommended network settings comprising a minimum bandwidth setting, maximum latency setting, maximum jitter setting, maximum acceptable packet loss rate, a combination thereof, and the like.

Multiple applications in the network may be determined to be priority applications, and different priority applications may recommend or require different levels of network service. For example, a video conferencing application 130 that is determined to be a priority application may require a minimum upload bandwidth of 3.8 Mbps, minimum download bandwidth of 3.0 Mbps, maximum latency of 150 ms, maximum jitter of 40 ms, and maximum acceptable packet loss at 2%. Meanwhile, a streaming media application 132 that is determined to be a priority application may require a minimum download bandwidth of 15 Mbps, maximum latency of 150 ms, maximum jitter of 40 ms, and maximum acceptable packet loss at 2%. The recommended network settings can be included in calendar details relating to the scheduled event and priority application. Alternatively or in conjunction, the recommended network settings corresponding to the priority level is stored in a network quality database 122. In an embodiment, network quality database 122 includes a list of different applications and corresponding priority levels of network service (e.g., different sets of recommended QoS parameters for supporting the respective application).

In some embodiments, the priority level of a priority application may be selected from a tiered set of service levels, stored in the network priority database 122. Tiered service levels are discussed in further detail in FIGS. 3A and 3B.

At step 1 of FIG. 1, calendar processing entity (CPE) 110 accesses and extracts calendar data from multiple distinct calendar applications 103, 105 of users (not shown) associated with user devices 102, 104 in network 101 to identify upcoming scheduled events which use a priority application (e.g., whether any of applications 130, 132 is associated with network priority) during the scheduled event. In the example, CPE 110 runs locally within network 101. In an embodiment, CPE 110 can be installed on and reside in a user device (or multiple user devices) associated with each user and have access to the user's respective calendar(s). For instance, a first user may be associated with user device 102 and a calendar 103. A second user may be associated with user device 104 and calendar 105. An instance of CPE 110 may be installed on user device 102 and have access to and extract calendar data from the first user's calendar 103. Another instance of CPE 110 may be installed on user device 104 and have access to and extract calendar data from the second user's calendar 105. In some embodiments, calendars 103, 105 may also reside within user devices 102, 104, respectively. The multiple instances of CPE 110 (e.g., one for each user and/or each user device 102, 104 and/or each application 130, 132) are referred to as CPE peers or peer CPEs.

In another embodiment, calendar processing functionality (e.g., CPE 110) can be built directly into the operating system of a user device (such as in the case of native calendaring applications of Outlook on Android, Calendar on iPhone, etc.). In yet another embodiment, CPE 110 executes on a cloud network (and calendars 103, 105 reside on the cloud), which is described in further detail in FIG. 2.

In an embodiment, CPE 110 periodically retrieves calendar entries from calendars 103, 105. For example, CPE 110 may scan calendars 103, 105 weekly for any occurrences of scheduled events that represent priority-sensitive application usage (e.g., video conferencing applications, applications used for scheduled events of high importance, etc.) that are scheduled for that week. In another embodiment, a respective calendar service associated with each calendar 103, 105 may push notifications of new scheduled events and/or updates to scheduled events to CPE 110, such that CPE 110 need not periodically scan contents of calendars 103, 105.

CPE 110 identifies from the calendar entries those that require priority applications. For each scheduled event, CPE 110 can determine from the calendar data anticipated usage of an application(s) (e.g., identify which application and at which time and date it will be used) and whether the application(s) is a priority application. A priority application is an application which is prioritized to receive network priority and may be determined based on one or more factors such as a desired or recommended priority level of the given application, calendar data (e.g., details relating to the scheduled event), historical usage data (e.g., past user behavior in similar scheduled events and/or when using the same priority application), and so forth. For example, calendar 103 may include a scheduled event (for the first user) comprising a meeting on Monday between 3 pm to 4 pm, wherein the calendar data includes an invitation recipient list comprising work email addresses and a hyperlink and access code for using a particular video conference application. Based on the calendar data, CPE 110 determines that the scheduled event will require use of video conferencing application 130. Calendar data may also indicate that the user's attendance is mandatory or that the user is the meeting host. Historical usage data may indicate that the Monday meeting from 3 pm to 4 pm is a weekly recurring meeting, wherein the user usually participates using video and audio and shares their screen. The recommended priority level of the video conferencing application 130 is above a particular threshold (e.g., 3.8 Mbps for upload bandwidth and 3.0 Mbps for download bandwidth). Based on the calendar data, historical usage data, and the recommended priority level of the video conferencing application 130, CPE 110 determines that video conferencing application 130 is a priority application.

CPE 110 can extract calendar data from multiple distinct calendar applications. For example, CPE 110 may access and extract calendar data from calendars 103 and 105 (e.g., corresponding to a first user and second user, respectively). Calendar 105 (of the second user) may include a scheduled event, also on Monday from 3 pm to 4 pm, which includes a link to log into a streaming media application and the title of a movie. Based on the calendar data, CPE 110 determines that the scheduled event will require use of streaming media application 132. Historical usage data may include data showing past logins by the user to the streaming media application 132, and that streaming media application 132 is associated with a personal account of the second user. Thus, CPE 110 may determine that streaming media application 132 during a weekday afternoon (e.g., business hours) is not a priority application.

In some embodiments, where a user is associated with multiple calendars, CPE 110 reconciles conflicts such as duplicate entries across the multiple calendars. For example, a user may be associated with a Google calendar and an Outlook calendar. Both calendars include their own entries for a scheduled event for Monday from 3 pm to 4 pm and require use of video conferencing application 130 that is determined to be a priority application. If the scheduled events were treated as separate but simultaneous events requiring network priority, insufficient network resources could be available or otherwise reserved for other unique instances of priority applications scheduled for overlapping times. CPE 110 may reconcile duplicate calendar entries by extracting and using calendar data on the scheduled event from one of the calendars and removing or disregarding duplicate scheduled events from the additional calendars. For example, CPE 110 may keep the scheduled event calendar entry in the Google calendar and remove the duplicate entry from the Outlook calendar. In another example, CPE 110 may identify only one instance of the application as the priority application (e.g., identifying the video conference application 130) required in the scheduled event from the Google calendar as the priority application, and the same video conferencing application 130 required by the scheduled event from the Outlook calendar as a non-priority application, or other suitable methods to indicate that network priority should be given to only a single device which uses the video conferencing application 130 during the time of the scheduled event. CPE 110 may identify that the same underlying scheduled event appearing on both the Google calendar and Outlook calendar based on one or more factors, such as the scheduled events having the same or overlapping times, same or similar event or activity names, same or similar hosts or participants, same application usage, same or similar connection details (e.g., video conferencing meeting ID, access code, or link, etc.), and the like.

Through the calendar data, CPE 110 can also access information relating to the hardware capabilities of the user device on which the priority application is run or otherwise accessed. For example, video conferencing application 130 may operate on user device 102. CPE 110 may determine the maximum quality level of a webcam coupled to user device 102, the highest sampling rate possible for an audio system of the user device 102, etc. Information on the hardware capabilities of the user device may be used by network management entity (NME) 120 to determine the appropriate priority level for the priority application and/or whether network priority can be provided to the priority application, discussed in step 3, below.

According to some embodiments, the system may be pre-detect when high levels of competition for network resources may occur and/or when a desired prioritization cannot be achieved. In other words, high demands for network resources may be predicted based on calendar data. For example, by connecting to a calendar (e.g., a calendaring system of a cloud services platform), situations where there may be high demand for bandwidth are visible through the calendar itself. For example, a user in a household may attempt to schedule (e.g., via calendar 105) to view a movie using streaming media application 132, but another household member has already scheduled (e.g., via calendar 103) a meeting using video conferencing application 130 for the same time and date. If the required capacity of the video conferencing call and movie exceeds the threshold network capacity, this may be reflected to the user via the calendar 105 user interface (e.g., by way of a warning notification, a prompt to reschedule or pre-download the movie, or a prompt to schedule the appointment to be run on a different device such as cable TV box). Predictions on future high levels of competition for network resources may also be based on historical usage data, such as past attendees associated with a meeting, frequencies, and topics of meetings, whether a recurring video conferencing meeting only utilizes share screen feature instead of streaming video, etc.

For an upcoming scheduled event which will use an application (e.g., priority application) requiring network priority, CPE 110 passes the application details to network management entity (NME) 120. Additionally, CPE 110 may pass details to NME 120 relating to the device that will execute the priority application or otherwise access the priority application.

In the example, NME 120 may run locally within network 101. In an embodiment, NME 120 can be installed (e.g., as a software package) on a user device (or multiple user devices), on which the priority application is run, associated with each user. For example, an instance of NME 120 may be installed in the same software package as an instance of CPE 110 on user device 102. Another instance of NME 120 may be installed in the same software package as another instance of CPE 110 on user device 104. The multiple instances of NME 120 (e.g., one for each user and/or each user device 102, 104 and/or each application 130, 132) are referred to as NME peers or peer NMEs. Each locally installed instance of NME 120 has access to information relating to the hardware capabilities of the corresponding device relating to performance of the respective priority application (e.g., the maximum quality level of the webcam of user device 102 to support video conferencing application 130, the highest sampling rate possible for an audio system of user device 104 to support streaming media application 132, etc.). In another embodiment, NME 120 executes on a cloud network, which is described in further detail in FIG. 2.

At step 2 of FIG. 1, NME 120 determines the network settings necessary for supporting performance of the priority application (e.g., video conferencing application 130), to be sent as part of a reconfiguration request to router 140. For example, NME 120 determines the details to include in the reconfiguration request, such as the name and application type of the priority application, the time period the priority application is scheduled to run, the priority level required or desired by the priority application, the current status of the network (e.g., current load) and/or anticipated status of the network at the time of the scheduled event (e.g., anticipated load with or without allocating network priority to the priority application at the time the event is scheduled for), a threshold network capacity, whether allocating network resources to the priority application at the time of the scheduled event would cause the total network usage to exceed a threshold network capacity, hardware capabilities of the device on which the priority application is run, etc.

Further, NME 120 determines the appropriate priority level needed for the priority application, based on one or more factors, such as recommended or required network settings associated with (e.g., requested by) the priority application, calendar data (e.g., details relating to the scheduled event), historical usage data (e.g., past user behavior and/or past levels of network service provided to the same application in similar scheduled events), and so forth. NME 120 may additionally consider the hardware capabilities of the user device on which the priority application is run. NME 120 may determine and consider whether both the network resources of network 101 and the hardware capabilities of the user device can support the needs of the priority application during the time of the scheduled event. Alternatively, NME 120 determines the priority level needed for the priority application by accessing and retrieving such data from a network quality database 122.

In an example, video conferencing application 130 may recommend a priority level to support 1080p video (for instance, a bandwidth of 5 Mbps), but the application is run on user device 102 which is equipped with only a 720p web camera. NME 120 may determine the appropriate priority level to include a maximum upstream bandwidth which supports 720p video (for instance, a bandwidth of 3 Mbps). In the reconfiguration request, NME 120 may request from router 140 to provide this level of network quality (e.g., bandwidth of 3 Mbps).

Figure 5:
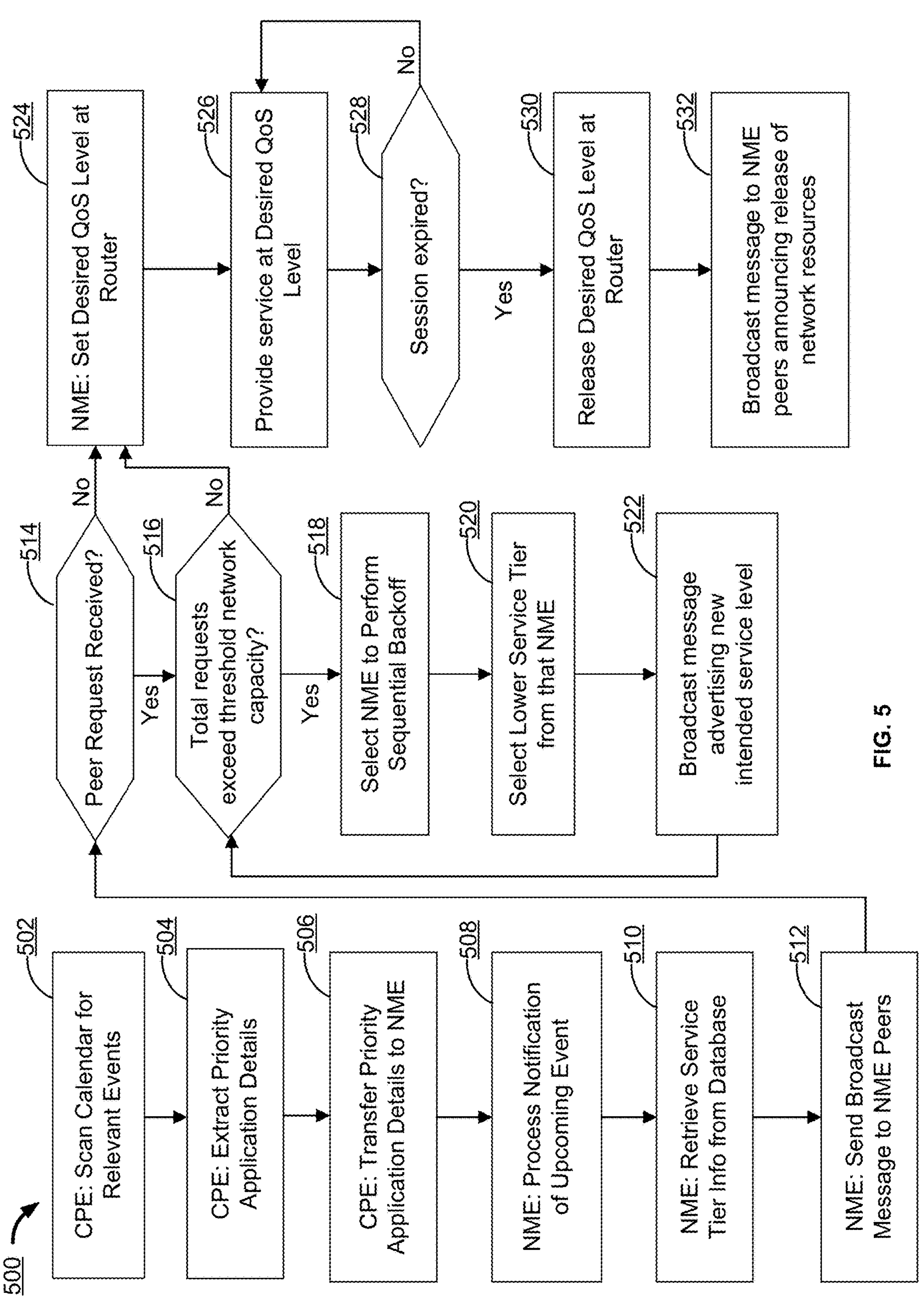
FIG. 5 is a flowchart of an example process of calendar-based QoS management of a network with multiple applications competing for network priority, in accordance with some embodiments of the disclosure.

In an embodiment, NME 120 may also consider whether there are any competing requests for network priority (e.g., when multiple priority applications request network priority at the same time, discussed in further detail in FIG. 5).

At step 3 of FIG. 1, NME 120 configures the network for the needs of the priority application (e.g., video conferencing application 130) by sending a reconfiguration request to router 140. The reconfiguration request reconfigures the QoS parameters of the router 140 according to the determined priority level (of network service) to support performance of the priority application on the user device for the duration of the scheduled event.

At step 4 of FIG. 1, router 140 provisions the priority application (e.g., video conferencing application 130) network resources at the desired network priority level and maintains provision of the priority level of service (e.g., maintains the QoS-prioritized traffic flow to user device 102 to support execution of video conferencing application 130) until the end of the scheduled event. When the scheduled event ends, the network resources are released and router 140 returns to its configuration prior to the reconfiguration request or is further reconfigured to support another priority application(s). In another embodiment, network resources may be released when the priority application has terminated. For example, if a video conferencing call ends earlier than scheduled, the network resources can be released sooner, and the network can return to its prior configuration settings. In another example, if a video conferencing call has run longer than scheduled, the network resources can continue to be provisioned to the priority application until the priority application has terminated, despite going past the scheduled event time.

In another embodiment, a plurality of priority applications (e.g., associated with different user calendars and/or different devices) compete for network resources of network 101 during the same time. Competing priority applications from events scheduled for the same time from multiple calendars and/or on multiple devices is discussed in further detail in FIG. 5.

Figure 2:
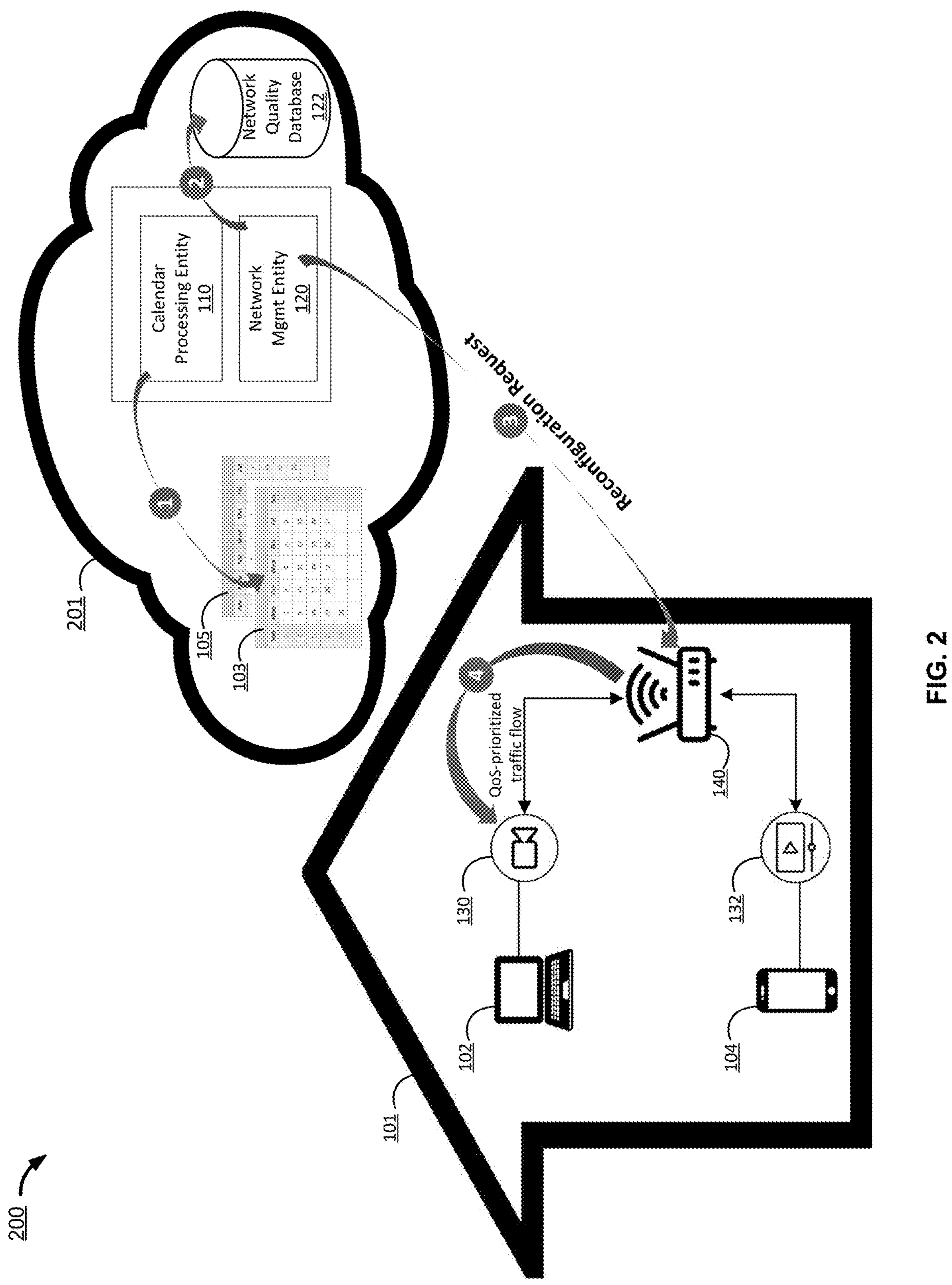
FIG. 2 is an illustrative diagram of a system for a cloud-based calendar-based QoS management of a network, in accordance with some embodiments of the disclosure.

In the aforementioned examples, QoS management of network 101 can be executed entirely in the network 101. In FIG. 2, cloud-based QoS management of the network (e.g., remote management) is described in further detail.

FIG. 2 is an illustrative diagram of an example system 200 for a cloud-based calendar-based QoS management of a network, in accordance with some embodiments of the disclosure. In an embodiment, the system comprises network 101 (such as a local area network) and a cloud network 201. Network 101 comprises user devices 102, 104 and router 140. Cloud network 201 comprises cloud-based calendars 103, 105, CPE 110 and NME 120 which reside on the cloud, and network quality database 122. In an embodiment, calendars 103, 105, CPE 110, NME 120, and network quality database 122 reside on a cloud network and communicate using any suitable API. Thus, calendars 103, 105 are accessible to CPE 110 and network quality database 122 is accessible to NME 120.

In another embodiment, cloud network 201 is provided by a common platform provider (e.g., calendars 103, 105, CPE 110, NME 120 are located on the same cloud network). Router 140 may be provided by the common platform provider (for instance, a Google-provided broadband router) and router 140 may have cloud-based management capabilities. In an example, CPE 110 extracts calendar data from calendar 103 and determines that a scheduled event requires use of video conferencing application 130. CPE 110 communicates details of the video conferencing application 130 (e.g., the required priority level and time of the scheduled event) to NME 120. NME 120 in turn manages and reconfigure the network QoS parameters of the router 140 according to the priority level.

In yet another embodiment, cloud network 210 comprises multiple cloud platforms from different providers. Thus, CPE 110 and NME 120 are located on separate clouds provided by different platform vendors. For example, a user may use Microsoft calendaring for work and have Google-provided networking equipment for their network 101. By a provisioning step, the calendaring data platform can be connected to the networking equipment platform, thereby allowing both platform vendors to share responsibility for provisioning. This may be done, for instance, by authenticating to one service or the other, and providing a URL to the peer CPE 110 and/or peer NME 120 in the other platform cloud (e.g., through the Microsoft Office 365 account, granting the Google Home Network Management platform access to poll data or receive notifications from the Microsoft calendar).

At step 1 of FIG. 2, CPE 110 extracts calendar data from calendars 103, 105. CPE 110 identifies a priority application (e.g., video conferencing application 130) associated with an upcoming scheduled event. At step 2 of FIG. 2, NME 120 accesses network quality database 122 and retrieves data on the priority level recommended for supporting the priority application at the scheduled event time. In an embodiment, NME 120 has remote access to details relating to network 101, such as its current status (e.g., current load on the network), threshold network capacity, etc. In some embodiments, NME may have remote access to user devices 102, 104 to retrieve details relating to their performance capabilities (e.g., to determine whether user device 102 has hardware capabilities to support execution of video conferencing application 130, etc.).

At step 3 of FIG. 2, NME 120 remotely manages router 140 and other access points located within network 101 or other on-premises networking equipment. NME 120 makes a remote reconfiguration request to router 140 to adjust its configuration settings according to the priority level appropriate for supporting priority application (e.g., video conferencing application 130). In the embodiment, NME 120 may remotely configure the QoS parameters on router 140 through programmatic API service to router 140. Such API may include a REST-based management interface, Simple Network Management Protocol (SNMP), among others. Then, at step 4 of FIG. 2, router 140 provides the necessary network resources to the priority application (e.g., video conferencing application 130) for the duration of the scheduled event, until runtime of the priority application is terminated, or until a competing request from another priority application causes further reconfiguration of router 140.

FIGS. 3A and 3B are illustrative schemas 300 and 350, respectively, of a network quality database 122, in accordance with some embodiments of the disclosure. In an embodiment, a priority application may correspond to a plurality of service tiers. Different applications may have different needs for prioritization and accordingly have sets of service tiers with different QoS parameters. For example, a priority application, such as a video conferencing application 130, may be associated with a schema 300 comprising three service tiers, ranked by performance. The service tiers may comprise a first tier for high performance, a second tier for middle performance, and third tier for low performance, each with its respective combination of QoS parameters and/or recommendations on adjustable factors which impact QoS (e.g., video bandwidth, throughput, availability, latency, jitter, packet loss, frame rate, bit rate, bit error rate, and so forth). In another example, streaming media application 132 may be associated with schema 350 comprising four service tiers, ranked by high-definition video mode quality.

In some embodiments, the highest service tier may be set as the default priority level for a priority application. If the network can afford to provide network resources at the highest service tier (e.g., without causing total usage to exceed a threshold network capacity), then the priority application will be provisioned as such. However, as will be described in FIG. 5, if network resources are insufficient to meet the highest service tier (e.g., due to competing usage by other applications, networking equipment limitations, etc.), then the priority application may be provisioned with resources at the next highest service tier available (e.g., middle tier).

Figure 4:
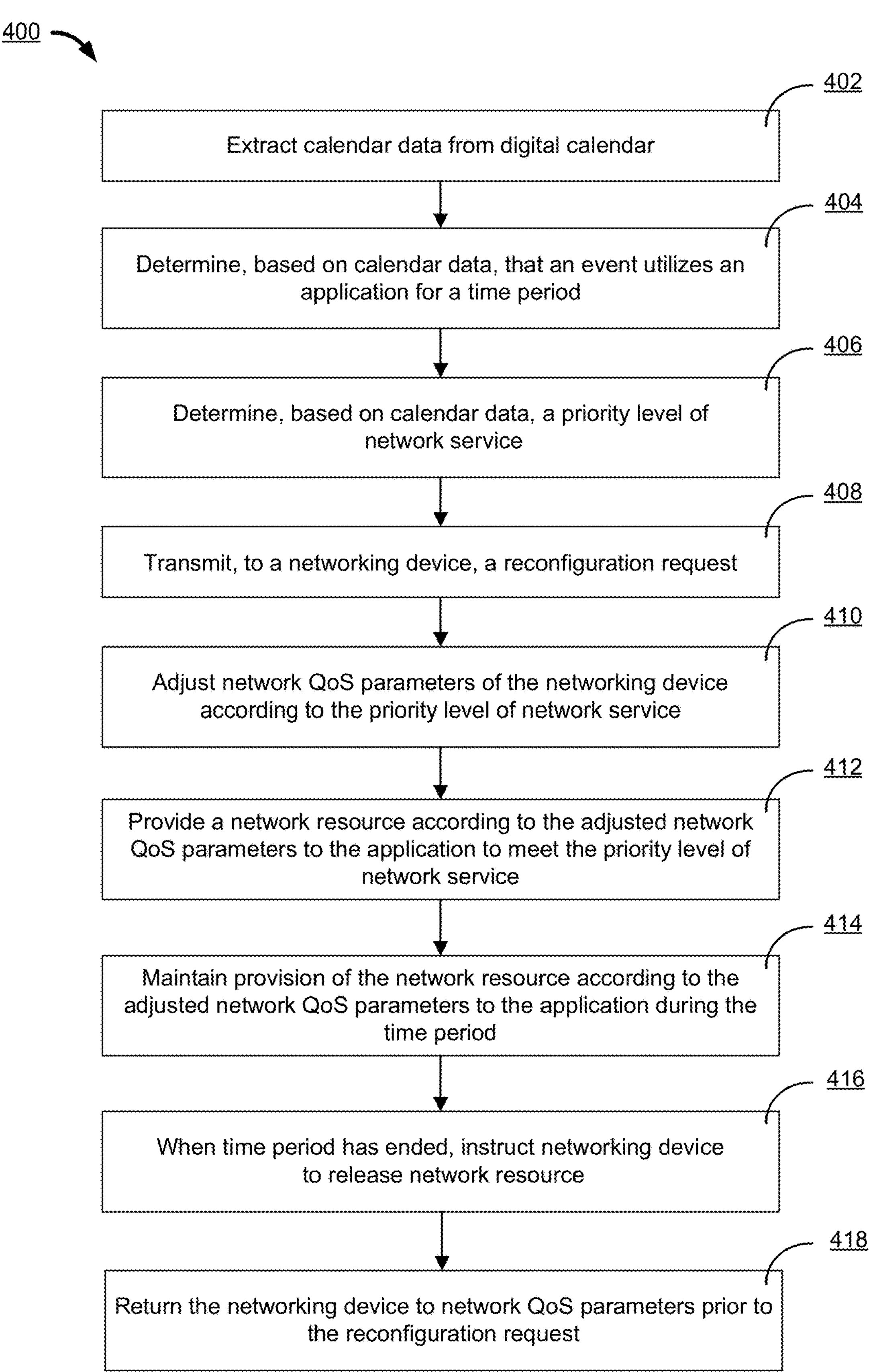
FIG. 4 is a flowchart of an example process of calendar-based QoS management of a network, in accordance with some embodiments of the disclosure.

FIG. 4 is a flowchart of an example process 400 of calendar-based QoS management of networks, in accordance with some embodiments of the disclosure. In an embodiment, at step 402, the process accesses and extracts calendar data from a digital calendar associated with a user. Calendar data may include scheduled events during which require use of an application (e.g., priority application) that requires network priority. The calendar may be located within the network (e.g., resides in a user device connected to the network) or the calendar may be provided by a cloud-based calendaring service. In an embodiment, calendar data may be extracted from digital calendars of multiple users associated with devices (e.g., on which applications will operate during a scheduled event) connected to the same network. In some embodiments, a user is associated with multiple calendars, for example, a Google calendar for work and an Outlook calendar for personal use, and duplicate entries may appear in both calendars. Duplicate entries may be detected when calendar data indicate that the entries refer to the same underlying event, such as being scheduled for a same or similar date and time, same or similar participants invited, same or similar application usage, same or similar event details and application access codes or links, and so forth. Upon detecting a duplicate event between calendars, the process may extract and use calendar data relating to the scheduled event from only one calendar and disregard or remove calendar data from the duplicate entries.

In an embodiment, at step 404, the process determines whether, based on the calendar data, there is a scheduled event which utilizes an application. For example, a scheduled event may have calendar details indicating a work meeting scheduled on Monday from 3 pm to 4 pm and including a link or access code to a Zoom meeting room. Based on the calendar data, the scheduled event utilizes a video conferencing application. An application which requires network priority is a priority application, and thereby has priority for network resources or service over other applications running concurrently on the same network. Network resources are provided to the priority application according to a priority level of network service (also referred to as priority level), such as a particular QoS parameter(s) (e.g., specific bandwidth, latency, etc.) to support performance on a user device. Further in the embodiment, the process determines whether the application requires a priority level of network service (e.g., whether the application is a priority application requiring network priority) based on the calendar data. For example, calendar data may include an importance level of the scheduled event, the type of event or activity involved (e.g., work, recreational, personal, attached meeting agenda, etc.), expected audio or video usage (e.g., whether the meeting is set for listen-only mode, screen sharing, etc.), time and date and/or duration of the scheduled event (e.g., during business hours, weekends, etc.), participant data (e.g., number of participants, identity of participants, which participants have mandatory attendance, etc.). Other factors may be used to determine whether the application is a priority application, such as application data (e.g., the type of application to be used, the priority level recommended by the application), manual configurations or user preferences (e.g., dedicating network priority to particular application types and/or users based on parental controls, etc.), and so forth.

At step 406, the process determines a priority level of network service to support performance of the priority application (e.g., on a corresponding user device) during the scheduled event. The priority level for the priority application comprises specific QoS parameters (e.g., particular bandwidth, latency, jitter, packet loss rate, etc.) for supporting operation of the priority application (e.g., on a user device). Different applications may have different needs for prioritization. For instance, some applications may require maximum bandwidth while others may be more latency sensitive. Other applications may be less sensitive to either bandwidth or latency considerations but favor consistency (e.g., low jitter) above other QoS parameters. In one example, a video conferencing application (e.g., application 130) may require a minimum upload bandwidth of 3.8 Mbps, minimum download bandwidth of 3.0 Mbps, maximum latency of 150 ms, maximum jitter of 40 ms, and maximum acceptable packet loss at 2%. In another example, a streaming media application (e.g., application 132) may require a minimum download bandwidth of 15 Mbps, maximum latency of 150 ms, maximum jitter of 40 ms, and maximum acceptable packet loss at 2%. The recommended network settings can be included in calendar details relating to the scheduled event and priority application.

In some embodiments, the priority level is determined based on one or more factors. Such factors may include a desired or recommended priority level of the given application, for example, a video conferencing application may recommend a particular combination of QoS parameters (such as specific bandwidth and latency) that facilitates optimal performance of the application on a corresponding user device. Factors may include calendar data, such as details indicating anticipated application usage, whether the user (associated with the calendar) is scheduled to share their screen during a video conference, whether and how many participants are required to participate in video and thus requiring higher QoS, and so forth. Factors may include historical usage data, such as characteristics of similar scheduled events in the past (e.g., such meetings have historically been conducted in listen-only mode and thus requiring lower QoS, etc.), and so forth.

Alternatively or in conjunction, the priority level may be determined from data stored in a network quality database. The network quality database includes a list of different applications and corresponding priority levels of network service (e.g., different sets of recommended QoS parameters for supporting the respective application). In further embodiments, the priority level may be selected from a tiered set of service levels. Selecting a particular service tier may be based on factors such as whether it can be supported by the available resources of the network (or the current network load or anticipated network load at the time of the scheduled event). The QoS demands of competing applications (e.g., multiple priority applications) running at the same time as the scheduled event and/or the hardware capabilities of the user device on which the priority application operates may also be considered in selecting the particular service tier.

In another embodiment, the priority level is manually configured or determined based on user preferences. For instance, network priority can by default be dedicated to a particular application or particular user device. Network priority can also be dedicated to applications and/or devices in the network associated with a particular user (e.g. based on parental controls, etc.).

At step 408, the process transmits a reconfiguration request to a networking device (e.g., router or other networking equipment) of a network (e.g., a local area network on which the priority application is to run). The reconfiguration request may be sent from the network (e.g., from an NME associated with a user device connected to the network), or from a cloud network (e.g., from an NME which resides in the cloud). In an embodiment, the reconfiguration request includes instructions to a networking device to adjust its QoS parameters according to the priority level of the priority application and to provision network resources at the priority level to the priority application during the time of the scheduled event. The reconfiguration request also includes the scheduled event time, identifies the application, identifies the user device on which the priority application will operate, and the like.

In some embodiments, the reconfiguration request is adjusted (and accordingly, the priority level of the priority application is adjusted) if the reconfiguration request cannot be met. For example, a different priority level is determined if provisioning the priority application at the original priority level (e.g., meeting the original reconfiguration request) would cause total network usage to exceed a threshold network capacity, if other concurrent applications are competing for network priority, if there are hardware limitations for supporting the priority application (e.g., the current state of the networking equipment and/or hardware capabilities of the user device on which the priority application is run cannot support the priority application at the priority level), and so forth. The threshold network capacity may be a maximum capacity (e.g., maximum QoS parameter(s) such as maximum bandwidth, minimum latency, minimum jitter, etc.) that the network (e.g., by way of the networking equipment such as the router or multiple routers) is capable of providing to applications running on user devices in the network. In some embodiments, the threshold network capacity is set at or below the maximum capacity. The maximum capacity may be an anticipated network capacity (e.g., the network capacity expected at the time of the scheduled event). In another instance, the maximum capacity may be a typical maximum capacity which the network usually has available (e.g., on average over a period of time).

In an example, a scheduled event for a recurring monthly work meeting may require a video conferencing application that requests a priority level of 3.8 Mbps upload bandwidth (which optimally supports sharing video and sharing screens). Provisioning the application at 5 Mbps during the scheduled event would otherwise result in the total network usage exceeding a threshold network capacity. However, historical data may show that during similar work meetings in prior months, the user only participated in listen-only mode and did not share their screen. Thus, a different (e.g., lower) priority level of 2.6 Mbps for the video conferencing application may be determined and transmitted in an updated reconfiguration request. Alternatively, in the situation where the priority level of the priority application is selected from a tiered set of service levels, the next lowest service tier may be selected. In another example, the video conferencing application may request 5 Mbps to support 1080p video, but the video conferencing application is run on a user device that is equipped with only a 720p web camera. A more appropriate priority level of 3 Mbps may be determined for video conferencing application and transmitted in an updated reconfiguration request.

At step 410, the network QoS parameters of the networking device are adjusted according to the priority level. In an embodiment, the networking device comprises a router. In some embodiments, the network includes multiple routers, from which a router is selected based on, for example, whether the router is capable of provisioning network resources at the priority level.

At step 412, the networking device provides network resources at this priority level to the priority application, and at step 414, the networking device maintains provision of such resources at the priority level for the duration of the scheduled event. In some embodiments, the networking device provisions the resources dynamically (e.g., adjusts the QoS parameters to provision the application at an adjusted priority level). For example, if the total network usage at some point during the scheduled event exceeds or is anticipated to exceed the threshold network capacity (e.g., due to a new competing request for network priority by another application, unscheduled applications suddenly consuming bandwidth, issues in the networking equipment or user devices such as hardware failures, etc.), the network is no longer be able to continue provisioning the priority application at the current priority level. Accordingly, the priority level may be adjusted (e.g., to a lower priority level). and (e.g., throttle).

At step 416, when the time period of the scheduled event has ended, the process instructs the networking device to release the network resource, such that network resources are available for other applications. In another embodiment, network resources may be released when the priority application has terminated, for example, if an event ends earlier or later than scheduled.

In some embodiments, at step 418, the networking device returns to its network QoS parameters prior to the adjustments made from the reconsideration request. In another embodiment, the network QoS parameters of the networking device remain at the current priority level until another application transmits a reconfiguration request.

FIG. 5 is a flowchart of an example process 500 of calendar-based QoS management of a network with multiple applications competing for network priority, in accordance with some embodiments of the disclosure. In an embodiment, a calendar processing entity (CPE) extracts calendar data from calendar applications associated with multiple users and identifies scheduled events which require use of priority applications. From the calendar data, a network management entity (NME) determines the priority levels for the priority applications and transmits reconfiguration requests to the networking device to provision network resources to each priority application according to the respective priority level.

In some embodiments, CPE and NME run locally on the network, wherein an instance of CPE and an instance of NME are located on each user device in the network. The multiple instances of CPE and NME are referred to as peer CPEs or CPE peers and peer NMEs or NME peers, respectively. Each peer CPE has access to the calendar(s) of the user associated with the respective user device to identify scheduled events requiring a priority application (which runs on the user device). Each peer NME manages the reconfiguration request of the priority application running on the respective user device in the scheduled event. In other embodiments, peer CPEs and peer NMEs are located on the cloud and one of each entity corresponds to each user associated with a user device in the network (e.g., by way of a user account provided by the service provider of the cloud). In yet another embodiment, a single instance each of CPE and NME are located on the cloud, where CPE accesses calendars of multiple users and NME manages the reconfiguration requests of multiple priority applications running on the user devices associated with the users. The single cloud-based NME can be associated with the network (e.g., the cloud-based control node for the router in the network).

According to some embodiments, the plurality of peer NMEs are co-located on the network, wherein each peer NME resides within a device, multiple devices, and/or on the cloud network (e.g., having remote access to one or multiple devices on the network). Thus, a network of five devices may have five peer NME each making network requests for a respective device. In an alternative embodiment, a single NME may exist on the network (e.g., on a device that can communicate with the user devices within the network) or on the cloud (e.g., a common user account for a cloud service) which can make network requests for all or some of the five devices. In a cloud-based implementation, multiple client devices within the network communicate with their respective calendar processing entities in the cloud (e.g., using a platform provider's cloud-based calendar service). These calendar requests originate from within the network, allowing the platform provider to determine the local router associated with this network, and thus the NME for the network. Thus the multiple requests for service arrive at the same NME (cloud-based, in this situation), which performs a similar multi-way prioritization process before remotely configuring the router or other networking device.

In an embodiment, at step 502, the CPE scans a calendar for relevant events (also referred to as scheduled events). A relevant event can be associated with a priority application (e.g., the event requires running the priority application for the duration or a portion of the event). In an embodiment, an application may be a priority application based on factors such as the type of application, calendar data (e.g., importance level of the scheduled event that the priority application is associated with, the time of day the priority application is associated with, whether the user's attendance is mandatory or optional, etc.), historical usage data (e.g., the extent to which the user participated in similarly scheduled events in the past, etc.), and so forth.

In some embodiments, when multiple priority applications are scheduled at the same time, the priority applications may be ranked. A higher ranked priority application is given higher network priority (e.g., network resources are provisioned to the higher ranked priority application at its desired priority level, while network resources are provisioned to the lower ranked priority applications at levels lower than their desired priority levels). Ranking may be based on the aforementioned factors (e.g., calendar data, historical usage data, etc.), manual configurations or user preferences (e.g., network priority is dedicated for particular applications and/or user devices based on parental controls), and so forth. For example, a video conferencing application may have higher priority than an application for gaming or streaming audio or media. An application associated with a work-oriented event (e.g., a work meeting), may have higher priority (e.g., higher importance level) than a scheduled event to watch a television show.

In other embodiments, the multiple priority applications are given network priority on a first-come first-served basis. For example, the first priority application to transmit its reconfiguration request will receive network priority at the highest priority level associated with the priority application. A second priority application which transmits its reconfiguration request may be provided network resources at a lower priority level than originally requested. The process for negotiating multiple competing reconfiguration requests is described further below.

At step 504, the CPE extracts details of the priority application, such as the name and type of the priority application, the priority level (e.g., priority level of network service for supporting the priority application on a user device), the type of scheduled event, the session time (e.g., scheduled start and end time), the device on which the priority application will operate, the router associated with the network to which the device is connected, whether the priority application is ranked higher than other concurrently scheduled priority applications, and so forth. The details of the priority application are included in the reconfiguration request, which instructs the network device to provide network resources to the priority application at the priority level during the scheduled event. At step 506, the CPE transfers the priority application details to the NME.

At step 508, the NME processes the notification from the CPE of the upcoming event. In an embodiment, the NME assesses the priority level of the priority application associated with the scheduled event, the time of the scheduled event, etc. The NME determines the priority level based on a desired or recommended priority level associated with the priority application which can be obtained by accessing a network quality database which stores hierarchies of service tiers corresponding to each application. The NME retrieves the service tier information for the priority application from the database at step 510. In an embodiment, the priority level from the highest service tier (e.g., highest performance) for the priority application may be selected as the default priority level. In other embodiments the NME determines the priority level based on calendar data (e.g., details indicating anticipated application usage, whether the user associated with the calendar is scheduled to share their screen during a video conference, whether and how many participants are required to participate in video mode and thus requiring higher QoS, whether a movie has already been downloaded prior to a scheduled event for movie watching and thus requires lower QoS etc.), historical usage data (whether previous similar scheduled events were conducted in listen-only mode and thus requiring lower QoS, etc.), and so forth.

The NME sends a reconfiguration request to the networking device, which instructs the networking device to provision network resources to the priority application at the priority level. In some embodiments, where a plurality of peer NMEs are located in corresponding user devices in the network (or where the peer NMEs remotely access, from the cloud, the corresponding user devices), each NME peer sends a reconfiguration request for the priority application scheduled to run on the respective user device. At step 512, the NME sends a broadcast message to other NME peers in the network (or for cloud-based NME, NME peers which have remote access to the network). The NME broadcasts (e.g., over the network) a message of an intent to request the highest service level that is within the network's capacity. If no competing requests from other NME peers are received (e.g., broadcast) through the network (such as within a threshold period of time), then the process continues to step 524 at which the NME sets the desired QoS level (e.g., adjusts the network QoS parameters according to the priority level) for the priority application at the router or other networking device.

Each NME peer may be associated with a unique identifier, and its broadcast message may include the identifier. If there are two or more applications competing for network priority for the same time (e.g., their scheduled events begin and/or start at the same time or have some overlap in the time of network use), then their corresponding NME peers may negotiate with each other and come to a mutual agreement on how to share network resources. In an embodiment, each NME peer determines an ideal prioritization (e.g., a desired and/or default priority level) for its client application, as well as several possible tier targets for lower levels of service. For example, an ideal (e.g., highest tier) bandwidth for a video conferencing application may be defined as 3.8 Mbps up/3.0 Mbps down for 1080p HD group calling quality. At its middle tier, only 2.6 Mbps up/1.8 Mbps down for 720p quality is required. In an embodiment, the NME does not consider a tier in between, because, for example, the middle tier is sufficient for 720p while a slightly higher setting in between would not suffice to permit 1080p.

At step 514, the process receives another request for network priority for a second priority application from a peer NME. At step 516, the process checks the status of the network and the QoS parameters requested by the competing NME peers to determine whether the resulting network usage would exceed a threshold network capacity. For example, if the total resource utilization of both requests is less than the threshold network capacity, then the original priority level requests of both applications can be provisioned at the network router. In another example, if the requested resources exceed the threshold network capacity (e.g., there are two requests for 3.8 Mbps upstream bandwidth, for two 1080p video conferencing calls, yet the threshold network capacity for upstream bandwidth is 6 Mbps), then both requests cannot be accommodated. The NME peers proceed to sequential backoff, wherein at least one peer NME steps back to the next highest service tier corresponding to its client application, lowering the priority level of the application. Sequential backoff is performed until all of the concurrent priority applications can be provisioned (according to their updated priority levels) without causing total network usage to exceed the threshold network capacity.

At step 518, at least one of the peer NMEs is selected to perform sequential backoff. In an embodiment, selecting which peer NME to perform sequential backoff first (and thus, which priority application will have its priority level lowered first) may be determined based on the rank of the priority application. For example, a video conferencing application and a streaming media application both require network priority for the same time and both request a priority level according to their respective highest service tier. Based on the importance levels of the scheduled events requiring those priority applications, whether attendance is mandatory, the time of day of the scheduled event, and so on, the video conferencing application may be ranked as higher priority than the streaming media application. Thus, the video conferencing application may be provided network priority at the highest service tier. Meanwhile, the NME associated with the lower ranking priority application (e.g., the streaming media application) may be selected to adjust the priority level of the streaming media application by stepping down to the next highest service tier. In another embodiment, the first peer NME to perform sequential backoff may be time based. For example, if the peer NME for the video conferencing application transmitted its reconfiguration request first before the peer NME for the streaming media application, then the NME for the video conferencing application is selected to sequentially step back to a lower priority (e.g., next highest tier). In yet another embodiment, the peer NMEs for all of the concurrent priority applications step back the priority level by one service tier at the same time.

At step 522, the NME reissues a broadcast message advertising the updated priority level. In an embodiment, the reissued broadcast is followed by a delay. If no additional messages are broadcast within the delay, and the total level of service requested is within the limits of the network, then both peer NMEs issue their reconfiguration requests to the router (e.g., the first NME request with the lowered service tier, and the second NME request with its original service tier) at step 524.

However, if the total requested resource level continues to exceed the threshold network capacity, then sequential backoff may alternate between the peer NMEs, each time a peer NME choosing a priority level for their respective client application that is one service tier lower than before. The peer NME (e.g., NME for the second priority application) reissues a broadcast message with a new, lower service level (e.g., the middle tier service). For example, the first round of sequential backoff may include the first NME (e.g., for the first priority application) lowering its request level from 3.8 Mbps (1080p) to 2.6 Mbps (720p). The total requested bandwidth (3.8 Mbps+2.6 Mbps=6.4 Mbps) still exceeds the threshold network capacity. The second NME (e.g., for the second priority application) then lowers its request level to the middle tier of 2.6 Mbps, and the total (2.6 Mbps+2.6 Mbps=5.2 Mbps) is now within the threshold network capacity. Thus, the two negotiated requests for service priority (e.g., both at the lower tier) are issued to the router (or other networking device(s)) at step 524. Network resources are provisioned to both applications at the middle tier service level accordingly, at step 526.

In some embodiments, the network may include multiple routers or other networking devices, and user device connections may be managed across the different routers and/or connections to balance competing requests for network priority. For example, when there are competing reconsideration requests for network priority for the same time, the different reconsideration requests can be transmitted to the multiple networking devices. Based on the priority level requested and/or limitations of the networking devices, the appropriate networking device is selected to process the reconsideration request (e.g., adjust its network QoS parameters according to the reconsideration request).

When the session expires at step 528, the network resources are released at step 530. At step 532, the NME may broadcast a message over the network to peer NMEs announcing release of the network resources, such that other applications may re-prioritize their own network service in light of the recently available additional network resources.

Choosing the sequence of which NME performs sequential backoff may be determined algorithmically, from timing of each NME request, or other methods. For example, the last NME to request access may be designated to perform the first backoff and accept a lower service. In another example, sequential backoff may be randomized or semi-randomized, such as in order by the unique identifier of each NME.

The sequential backoff and negotiation process is dynamic to accommodate changing application conditions. In the example, although the first and second priority have resolved their conflicting requests for network priority by both accepting a middle tier service, at some point during the session (e.g., when the two applications are actively receiving the middle-tiered network service), a third priority application may make a request for network priority at the highest tier. Adding this third request would result in exceeding the threshold network capacity. The renegotiation process runs again, and all three applications ultimately step down to the lowest service tier such that all of their usages can fit within the threshold network capacity.

Alternatively, in place of sequential backoff, where the NME runs locally on a device (e.g., a desktop or laptop), the NME may present a user interface indicating that multiple prioritization requests are being made and to allow the user to explicitly choose how to prioritize the applications.

In another embodiment, the new application (e.g., unscheduled application) may directly consume network resources, unannounced, without any requests to the router. For example, the first and second priority application (e.g., two video conferencing calls) are being provisioned simultaneously with network resources at the middle tier service, at 2.6 Mbps up/1.8 Mbps down for each video stream (5.2 Mbps up/3.6 Mbps down in total), in a home network where the threshold network capacity is 6 Mbps up/4 Mbps down. During their session, an unscheduled, high-bandwidth application (e.g., streaming media) begins, which requires 5 Mbps downstream for 1080p or 3 Mbps downstream for 720p. This new demand exceeds the threshold network capacity, and the unscheduled application does not have an NME negotiating bandwidth on its behalf. In one embodiment, the NMEs for the first and second priority applications can detect (e.g., by ongoing monitoring of the network) that the current network demand will result in their QoS requests not being satisfied due to the presence of the unscheduled application. The first and second NME may attempt to renegotiate the QoS level for their video conferencing applications down to the next lowest tier. In another embodiment, upon detecting that the new network demand by the unscheduled application is lowering the bandwidth available for their applications to an unacceptable level, the first and/or second NME may communicate with the router to directly throttle the unscheduled application flows to limit the unscheduled application's network utilization.

In yet another embodiment, a network performance database may be used, which can be extended to contain data about acceptable service tiers for unscheduled applications. The first and/or second NMEs may communicate to the router to step back the service level of the unscheduled application on a tier-by-tier basis, attempting to achieve a balanced priority across all applications.

According to some embodiments, high demands for network resources may be extended upstream to impact WAN service. This can increase overall available bandwidth, particularly where negotiation and throttling of the network resources for multiple competing applications is not sufficient to support acceptable application performance while maintaining total usage within the threshold network capacity. In an example, ISPs may trade off downstream and upstream bandwidth to the network, supplying more or one at the expense of the other. For example, network operators that use DOCSIS may be able to configure the head-end cable modem termination system to reallocate downstream frequencies to upstream communication. In other instances, ISPs may be mobile virtual network operators (MVNOs) and may have access to the 4G or 5G spectrum, beyond the Wi-Fi capacity present in the home network. Thus, ISPs may be used to configure upstream (WAN) network resources to better accommodate the demands of the home network, particularly when those demands can be detected a priori. For example, the NME may send to the router a WAN re-prioritization request which triggers reallocation of network resources and contains details about the desired service level needed to adequately prioritize the resources.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically tuning network quality-of-service (QoS) parameters, the method comprising:

extracting first calendar data from a first digital calendar;

determining, based at least in part on the first calendar data:

(a) that a first event utilizes a first application for a time period, and (b) a first priority level of network service to support performance of the first application during the time period, wherein the first priority level corresponds to a first data structure comprising a first plurality of QoS factors associated with the first application;

extracting second calendar data from a second digital calendar;

determining, based at least in part on the second calendar data:

(a) that a second event utilizes a second application for at least a portion of the time period, and (b) a second priority level of network service to support performance of the second application during the portion of the time period, wherein the second priority level corresponds to a second data structure comprising a second plurality of QoS factors associated with the second application;

based on determining that a combination of the first priority level and the second priority level exceeds a threshold network capacity:

determining, based at least in part on the first application, a respective minimum quality level for each QoS factor of the first plurality of QoS factors;

modifying the first data structure by modifying, based at least in part on the determined respective minimum quality level for each QoS factor of the first plurality of QoS factors, one or more QoS factors of the first plurality of QoS factors of the first data structure, wherein the modified first data structure corresponds to a lower first priority level of network service to support a lower performance of the first application such that the combination of the lower first priority level and the second priority level does not exceed the threshold network capacity;

transmitting, to a router, a reconfiguration request, wherein the reconfiguration request causes the router to:

adjust from a first network QoS parameter setting to a second network QoS parameter setting according to the combination of the lower first priority level and the second priority level;

provide a network resource according to the second network QoS parameter setting to the first application to meet the lower first priority level and to the second application to meet the second priority level;

maintain provisioning of the network resource according to the second network QoS parameter setting to the first application and the second application during the portion of the time period; and based at least in part on determining that the portion of the time period has ended, instructing the router to release the network resource, wherein the release of the network resource returns the router to the first network QoS parameter setting from prior to the reconfiguration request.

2. The method of claim 1, wherein the determining the respective priority level of network service for each of the first application and the second application is based on at least one of: an importance level of each respective event, an event type, the time period, type of participants of each respective event, participant behavior during each respective event, type of activity performed through each respective application during each respective event, or expected audio or video usage during each respective event.

3. The method of claim 1, wherein the first plurality of QoS factors and the second plurality of QoS factors respectively comprise at least one of a bandwidth setting, latency setting, jitter setting, or packet loss setting.

4. The method of claim 1, wherein the determining the respective priority level of network service for each of the first application and the second application is based on data retrieved from a network quality database that includes a respective priority level of network service for each of a plurality of applications.

5. The method of claim 1, wherein each of the first and the second applications is associated with a respective hierarchy of service tiers, wherein each service tier corresponds to a different priority level of network service to support different performance levels of the respective application, and wherein each service tier corresponds to a different modification of one or more QoS factors of a respective data structure associated with each respective application.

6. The method of claim 1, wherein the instructing the router to release the network resource further comprises determining that both of the first application and the second application have terminated.

7. The method of claim 1, wherein the reconfiguration request is based on at least one of: a respective priority level of network service of each of the first event and the second event, an importance level of the first event compared to an importance level of the second event, or a timing of a priority level request of each event.

8. The method of claim 1, wherein the reconfiguration request comprises a request for the lower first priority level corresponding to a first lower service tier associated with the first application and a request for a lower second priority level corresponding to a second lower service tier associated with the second application.

9. The method of claim 1, further comprising:

detecting that total network usage exceeds the threshold network capacity due to usage by a third application associated with an event not in the first digital calendar or the second digital calendar; and instructing the router to throttle the usage by the third application such that the total network usage does not exceed the threshold network capacity.

10. The method of claim 1, further comprising:

detecting that a third event requiring use of a third application is being added to the first digital calendar for at least a second portion of the time period, wherein the third application corresponds to a third priority level of network service;

determining that a combination of the lower first priority level of network service, the second priority level of network service, and the third priority level of network service exceeds the threshold network capacity; and recommending an alternate time period for scheduling the third event.

11. The method of claim 1, further comprising:

extracting third calendar data from a third digital calendar;

determining, based at least in part on the third calendar data, that a third event utilizes the first application for the time period;

determining, based at least in part on at least one of the first calendar data and the third calendar data, that the first event and the third event are the same event; and wherein the reconfiguration request is further based on data of the first event and disregards data of the third event.

12. The method of claim 1, wherein the release of the network resource further comprises:

broadcasting a message to a network associated with the router announcing availability of the released network resource.

13. A system for automatically tuning network quality-of-service (QoS) parameters, the system comprising:

control circuitry configured to:

extract first calendar data from a first digital calendar;

determine, based at least in part on the first calendar data:

(a) that a first event utilizes a first application for a time period, and (b) a first priority level of network service to support performance of the first application during the time period, wherein the first priority level corresponds to a first data structure comprising a first plurality of QoS factors associated with the first application;

extract second calendar data from a second digital calendar;

determine, based at least in part on the second calendar data:

(a) that a second event utilizes a second application for at least a portion of the time period, and (b) a second priority level of network service to support performance of the second application during the portion of the time period, wherein the second priority level corresponds to a second data structure comprising a second plurality of QoS factors associated with the second application;

based on determining that a combination of the first priority level and the second priority level exceeds a threshold network capacity:

determine, based at least in part on the first application, a respective minimum quality level for each QoS factor of the first plurality of QoS factors;

modify the first data structure by modifying, based at least in part on the determined respective minimum quality level for each QoS factor of the first plurality of QoS factors, one or more QoS factors of the first plurality of QoS factors of the first data structure, wherein the modified first data structure corresponds to a lower first priority level of network service to support a lower performance of the first application such that the combination of the lower first priority level and the second priority level does not exceed the threshold network capacity;

transmit, to a router, a reconfiguration request, wherein the reconfiguration request causes the router to:

adjust from a first network QoS parameter setting to a second network QoS parameter setting according to the combination of the lower first priority level and the second priority level;

provide a network resource according to the second network QoS parameter setting to the first application to meet the lower first priority level and to the second application to meet the second priority level;

maintain provisioning of the network resource according to the second network QoS parameter setting to the first application and the second application during the portion of the time period; and based at least in part on determining that the portion of the time period has ended, instruct the router to release the network resource, wherein the release of the network resource returns the router to the first network QoS parameter setting from prior to the reconfiguration request.

14. The system of claim 13, wherein determining a respective priority level of network service for each of the first application and the second application is based on at least one of: an importance level of each respective event, an event type, the time period, type of participants of each respective event, participant behavior during the respective event, type of activity performed through each respective application during each respective event, or expected audio or video usage during each respective event.

15. The system of claim 13, wherein each of the first and the second applications is associated with a respective hierarchy of service tiers, wherein each service tier corresponds to a different priority level of network service to support different performance levels of the respective application, and wherein each service tier corresponds to a different modification of one or more QoS factors of a respective data structure associated with each respective application.

16. The system of claim 13, wherein the instructing the router to release the network resource further comprises determining that both of the first application and the second application have terminated.

17. The system of claim 13, wherein the control circuitry is further configured to:

detect that total network usage exceeds the threshold network capacity due to usage by a third application associated with an event not in the first digital calendar or the second digital calendar; and instruct the router to throttle the usage by the third application such that the total network usage does not exceed the threshold network capacity.

18. The system of claim 13, wherein the control circuitry is further configured to:

detect that a third event requiring use of a third application is being added to the first digital calendar for at least a second portion of the time period, wherein the third application corresponds to a third priority level of network service;

determine that a combination of the lower first priority level of network service, the second priority level of network service, and the third priority level of network service exceeds the threshold network capacity; and recommend an alternate time period for scheduling the third event.

* * * * *